(12) United States Patent
Norton et al.

(10) Patent No.: US 7,793,293 B2
(45) Date of Patent: Sep. 7, 2010

(54) PER PROCESSOR SET SCHEDULING

(75) Inventors: Scott J. Norton, San Jose, CA (US);
Hyun J. Kim, Sunnyvale, CA (US);
Swapneel Kekre, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1602 days.

(21) Appl. No.: 10/979,060

(22) Filed: Nov. 1, 2004

(65) Prior Publication Data

US 2006/0095908 A1 May 4, 2006

(51) Int. Cl.
*G06F 9/46* (2006.01)
(52) U.S. Cl. .................. 718/102; 718/105
(58) Field of Classification Search .......... 718/100, 718/102, 103, 104, 105
See application file for complete search history.

(56) References Cited

U.S. PATENT DOCUMENTS

| | | | | |
|---|---|---|---|---|
| 5,379,432 A | * | 1/1995 | Orton et al. | 719/315 |
| 5,404,529 A | * | 4/1995 | Chernikoff et al. | 719/315 |
| 5,455,951 A | * | 10/1995 | Bolton et al. | 718/103 |
| 5,481,719 A | * | 1/1996 | Ackerman et al. | 718/108 |
| 5,729,710 A | * | 3/1998 | Magee et al. | 711/203 |
| 5,771,383 A | * | 6/1998 | Magee et al. | 719/312 |
| 6,289,369 B1 | * | 9/2001 | Sundaresan | 718/103 |
| 6,675,191 B1 | * | 1/2004 | Ito | 718/102 |
| 6,728,959 B1 | * | 4/2004 | Merkey | 718/102 |
| 6,735,613 B1 | * | 5/2004 | Jean-Dominique et al. | 718/104 |
| 6,957,435 B2 | * | 10/2005 | Armstrong et al. | 718/104 |
| 2002/0073129 A1 | * | 6/2002 | Wang et al. | 709/102 |
| 2002/0198924 A1 | * | 12/2002 | Akashi et al. | 709/102 |
| 2004/0010667 A1 | | 1/2004 | Brenner | |
| 2004/0267865 A1 | | 12/2004 | Cuervo | |
| 2005/0198102 A1 | * | 9/2005 | Hahn et al. | 709/200 |
| 2006/0095909 A1 | | 5/2006 | Norton | |
| 2006/0168254 A1 | | 7/2006 | Norton | |

OTHER PUBLICATIONS

Marisa Gil et al. "The Enhancement of a User-level Thread Package Scheduling on Multiprocessors", Sep. 1994, Euromicro Workshop on Parallel and Distributed Processing, pp. 1-9.*
Rashid, Richard, "Mach: A Foundation for Open Systems", IEEE 1989, pp. 1-6.*
U.S. Appl. No. 10/979,412, Non-Final Rejection dated May 1, 2009 (20 pages including attachments).
U.S. Appl. No. 10/979,407, Non-Final Rejection dated Sep. 3, 2009 (11 pages including attachment).
U.S. Appl. No. 10/979,407, Non-Final Rejection dated Apr. 20, 2009 (13 pages including attachments).

* cited by examiner

*Primary Examiner*—Van H Nguyen

(57) ABSTRACT

An arrangement, in a computer system, for coordinating scheduling of threads on a plurality of processor sets (PSETs). The arrangement includes a first processor set (PSET) having a first set of scheduling resources, the first set of scheduling resources. The arrangement further includes a second processor set (PSET) having a second set of scheduling resources. The first set of scheduling resources is configured to schedule threads assigned to the first PSET only among processors of the first PSET, and the second set of scheduling resources is configured to schedule threads assigned to the second PSET only among processors of the second PSET.

30 Claims, 10 Drawing Sheets

PER PROCESSOR SET SCHEDULING

CROSS REFERENCE TO RELATED APPLICATIONS

The present invention is related to the following applications, all of which are incorporated herein by reference:

U.S. Ser. No. 10/979,412, titled "AUTOMATIC POLICY SELECTION," filed Nov. 1, 2004 (U.S. Patent Publication No. 20060168254), and U.S. Ser. No. 10/979,407, titled "ADAPTIVE COOPERATIVE SCHEDULING," filed Nov. 1, 2004 (U.S. Patent Publication No. 20060095909).

BACKGROUND OF THE INVENTION

Processor set (PSET) arrangements have been employed manage processor resources in a multi-processor computer system. In a multi-processor computer system, the processors may be partitioned into various processor sets (PSETs), each of which may have any number of processors. Applications executing on the system are then assigned to specific PSETs. Since processors in a PSET do not share their processing resources with processors in another PSET, the use of PSETs renders it possible to guarantee an application or a set of applications a guaranteed level of processor resources.

To facilitate discussion, FIG. 1A shows a plurality of processors 102, 104, 106, 108, 110, 112, 114 and 116. In the example of FIG. 1A, processors 102, 104, and 106 are partitioned in a PSET 120, processors 108 and 110 are partitioned in a PSET 122, processor 112 is partitioned in a PSET 124, and processors 114 and 116 are partitioned in a PSET 126. An application 140 assigned to execute in PSET 120 may employ the processing resources of processors 102, 104, and 106 but would not be able to have its threads executed on processor 112 of PSET 124. In this manner, an application 142 assigned to execute in PSET 124 can be assured that the processing resources of processor 112 therein would not be taken up by applications assigned to execute in other PSETs.

However, when it comes to scheduling, the scheduling resources of the thread launcher, the thread balancer, and the thread stealer policies are still applied on a system-wide basis, i.e., across PSET boundaries. To elaborate, in a computer system, a scheduler subsystem is often employed to schedule threads for execution on the various processors. One major function of the scheduler subsystem is to ensure an even distribution of work among the processors so that one processor is not overloaded while others are idle.

In a modern operating system, such as the HP-UX® operating system by the Hewlett-Packard Company of Palo Alto, Calif., as well as in many modern Unix and Linux operating systems, the scheduler subsystem may include three components: the thread launcher, the thread balancer, and the thread stealer.

With reference to FIG. 1B, kernel 152 may include, in addition to other subsystems such as virtual memory subsystem 154, I/O subsystem 156, file subsystem 158, networking subsystem 160, and a process management subsystem 162, a scheduler subsystem 164. As shown, scheduler subsystem 164 includes three components: a thread launcher 170, a thread balancer 172, and a thread stealer 174. These three components are coupled to a thread dispatcher 188, which is responsible for placing threads onto the processor's per-processor run queues as will be discussed herein.

Thread launcher 170 represents the mechanism for launching a thread on a designated processor, e.g., when the thread is started or when the thread is restarted after having been blocked and put on a per-processor run queue (PPRQ). As is known, a per-processor run queue (PPRQ) is a priority-based queue associated with a processor. FIG. 1B shows four example PPRQs 176a, 176b, 176c, and 176d corresponding to CPUs 178a, 178b, 178c, and 178d as shown.

In the PPRQ, threads are queued up for execution by the associated processor according to the priority value of each thread. In an implementation, for example, threads are put into a priority band in the PPRQ, with threads in the same priority band being queued up on a first-come-first-serve basis. For each PPRQ, the kernel then schedules the threads therein for execution based on the priority band value.

To maximize performance, thread launcher 170 typically launches a thread on the least-loaded CPU. That is, thread launcher 170 instructs thread dispatcher 188 to place the thread into the PPRQ of the least-loaded CPU that it identifies. Thus, at least one piece of data calculated by thread launcher 170 relates the least-loaded CPU ID, as shown by reference number 180.

Thread balancer 172 represents the mechanism for shifting threads among PPRQs of various processors. Typically, thread balancer 172 calculates the most loaded processor and the least loaded processor among the processors, and shifts one or more threads from the most loaded processor to the least loaded processor each time thread balancer 172 executes. Accordingly, at least two pieces of data calculated by thread balancer 172 relate to the most loaded CPU ID 182 and the least loaded CPU ID 184.

Thread stealer 174 represents the mechanism that allows an idle CPU (i.e., one without a thread to be executed in its own PPRQ) to "steal" a thread from another CPU. Thread stealer accomplishes this by calculating the most loaded CPU and shifts a thread from the PPRQ of the most loaded CPU that it identifies to its own PPRQ. Thus, at least one piece of data calculated by thread stealer 174 relates the most-loaded CPU ID. The thread stealer performs this calculation among the CPUs of the system, whose CPU IDs are kept in a CPU ID list 186.

In a typical operating system, thread launcher 170, thread balancer 172, and thread stealer 174 represent independently operating components. Since each may execute its own algorithm for calculating the needed data (e.g., least-loaded CPU ID 180, most-loaded CPU ID 182, least-loaded CPU ID 184, the most-loaded CPU ID among the CPUs in CPU ID list 186), and the algorithm may be executed based on data gathered at different times, each component may have a different idea about the CPUs at the time it performs its respective task. For example, thread launcher 170 may gather data at a time t1 and executes its algorithm, which results in the conclusion that the least loaded CPU 180 is CPU 178c. Thread balancer 172 may gather data at a time t2 and executes its algorithm, which results in the conclusion that the least loaded CPU 184 is a different CPU 178a. In this case, both thread launcher 170 and thread balancer 172 may operate correctly according to its own algorithm. Yet, by failing to coordinate (i.e., by executing their own algorithms and/or gathering system data at different times), they arrive at different calculated values.

The risk is increased for an installed OS that has been through a few update cycles. If the algorithm in one of the components (e.g., in thread launcher 170) is updated but there is no corresponding update in another component (e.g., in thread balancer 172), there is a substantial risk that these two components will fail to arrive at the same calculated value for the same scheduling parameter (e.g., the most loaded CPU ID).

The net effect is rather chaotic and unpredictable scheduling by scheduler subsystem 164. For example, it is possible for thread launcher 170 to believe that CPU 178a is the least loaded and would therefore place a thread A on PPRQ 176a associated with CPU 178a for execution. If thread stealer 174 is not coordinating its effort with thread launcher 170, it is possible for thread stealer 174 to believe, based on the data it obtained at some given time and based on its own algorithm, that CPU 178a is the most loaded. Accordingly, as soon as thread A is placed on the PPRQ 176a for execution on CPU 178a, thread stealer 174 immediately steals thread A and places it on PPRQ 176d associated with CPU 178d.

Further, if thread balancer 172 is not coordinating its effort with thread launcher 170 and thread stealer 174, it is possible for thread balancer 172 to believe, based on the data it obtained at some given time and based on its own algorithm, that CPU 178d is the most loaded and CPU 178a is the least loaded. Accordingly, as soon as thread A is placed on the PPRQ 176d for execution on CPU 178d, thread balancer 172 immediately moves thread A from PPRQ 176d back to PPRQ 176a, where it all started.

During this needless shifting of thread A among the PPRQs, the execution of thread A is needlessly delayed. Further, overhead associated with context switching is borne by the system. Furthermore, such needless shifting of threads among PPRQs may cause cache misses, which results in a waste of memory bandwidth. The effect on the overall performance of the computer system may be quite noticeable.

Furthermore, since the scheduling policies are the same for all PSETs, there may be instances when scheduling decisions regarding thread evacuation, load balancing, or thread stealing involve processors from different PSETs.

In other words, a single thread launching policy is applied across all processors irrespective of which PSET a particular processor is associated with. Likewise, a single thread balancing policy is applied across all processors and a single thread stealing policy is applied across all processors.

As can be appreciated from FIG. 1C, certain scheduling instructions from thread launcher 192, thread balancer 194, and thread stealer 196, such as those involving processors associated with different PSETs 198a, 198b, and 198c, must be disregarded by the dispatchers 199a, 199b, and 199c in the PSETs if processor partitioning integrity is to be observed. When such scheduling instructions are disregarded in order to maintain processor partition integrity within the PSETs, the threads are not scheduled in the most efficient manner, and the system processor bandwidth is also not utilized in the most efficient manner.

SUMMARY OF THE INVENTION

The invention relates, in an embodiment, to an arrangement, in a computer system, for coordinating scheduling of threads on a plurality of processor sets (PSETs), each of the plurality of PSETs having a plurality of processors. The arrangement includes a first processor set (PSET) having a first plurality of processors and a first set of scheduling resources, the first set of scheduling resources including at least two of a first thread launcher, a first thread balancer, and a first thread stealer. The arrangement further includes a second processor set (PSET) having a second plurality of processors and a second set of scheduling resources, the second set of scheduling resources including at least two of a second thread launcher, a second thread balancer, and a second thread stealer. The first set of scheduling resources is configured to schedule threads assigned to the first PSET only among processors of the first plurality of processors, and the second set of scheduling resources is configured to schedule threads assigned to the second PSET only among processors of the second plurality of processors.

In another embodiment, the invention relates to an arrangement for coordinating scheduling of threads in a computer system having a first processor set (PSET) and a second PSET. The first PSET is associated with a first plurality of processors, the second PSET being associated with a second plurality of processors. The arrangement includes first scheduling resource means associated with the first PSET, the first scheduling resource means being configured to implement at least two of a first thread launcher, a first thread balancer, and a first thread stealer. The arrangement further includes second scheduling resource means associated with the second PSET, the second scheduling resource means being configured to implement at least two of a second thread launcher, a second thread balancer, and a second thread stealer. The first scheduling resource means is configured to schedule threads assigned to the first PSET only among processors of the first plurality of processors, and the second scheduling resource means is configured to schedule threads assigned to the second PSET only among processors of the second plurality of processors.

In yet another embodiment, the invention relates to a method, in a computer system, for scheduling threads for execution. The method includes providing a first processor set (PSET) having a first plurality of processors and a first set of scheduling resources, the first set of scheduling resources including at least two of a first thread launcher, a first thread balancer, and a first thread stealer. The method further includes providing a second processor set (PSET) having a second plurality of processors and a second set of scheduling resources, the second set of scheduling resources including at least two of a second thread launcher, a second thread balancer, and a second thread stealer. The method also includes scheduling, using the first set of scheduling resources, threads assigned to the first PSET only among processors of the first plurality of processors. The method moreover includes scheduling, using the second set of scheduling resources, threads assigned to the second PSET only among processors of the second plurality of processors.

In yet another embodiment, the invention relates to an article of manufacture comprising a program storage medium having computer readable code embodied therein, the computer readable code being configured to schedule threads for execution on a computer having at least a first processor set (PSET) and a second PSET. The first processor set (PSET) has a first plurality of processors and a first set of scheduling resources, the first set of scheduling resources including at least two of a first thread launcher, a first thread balancer, and a first thread stealer. The second processor set (PSET) has a second plurality of processors and a second set of scheduling resources, the second set of scheduling resources including at least two of a second thread launcher, a second thread balancer, and a second thread stealer. There is included computer readable code for scheduling, using the first set of scheduling resources, threads assigned to the first PSET only among processors of the first plurality of processors. There is also included computer readable code for scheduling, using the second set of scheduling resources, threads assigned to the second PSET only among processors of the second plurality of processors.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment of the invention, there is provided with a scheduler subsystem a cooperative scheduling component (CSC) configured to provide unified scheduling-related parameters (USRPs) pertaining to the system's processors to the thread launcher, the thread balancer, and the thread stealer in an operating system. In an embodiment, the CSC is configured to obtain system information in order to calculate scheduling-related parameters such as the most loaded processor, the least loaded processor, the starving processor(s), the non-starving processor(s), run-time behavior of threads, per-processor load information, NUMA (Non-Uniform Memory Access) topology, and the like. The scheduling-related parameters are then furnished to the thread launcher, the thread balancer, and the thread stealer to allow these components to perform their respective tasks.

Since the scheduling-related parameters are calculated by a single entity (i.e., the CSC), the prior art problem of having different components individually obtaining system data and calculating their own scheduling-related parameters at different times is avoided. In this manner, the CSC provides data coordination to prevent components from undoing each other's work.

Figure 1A:
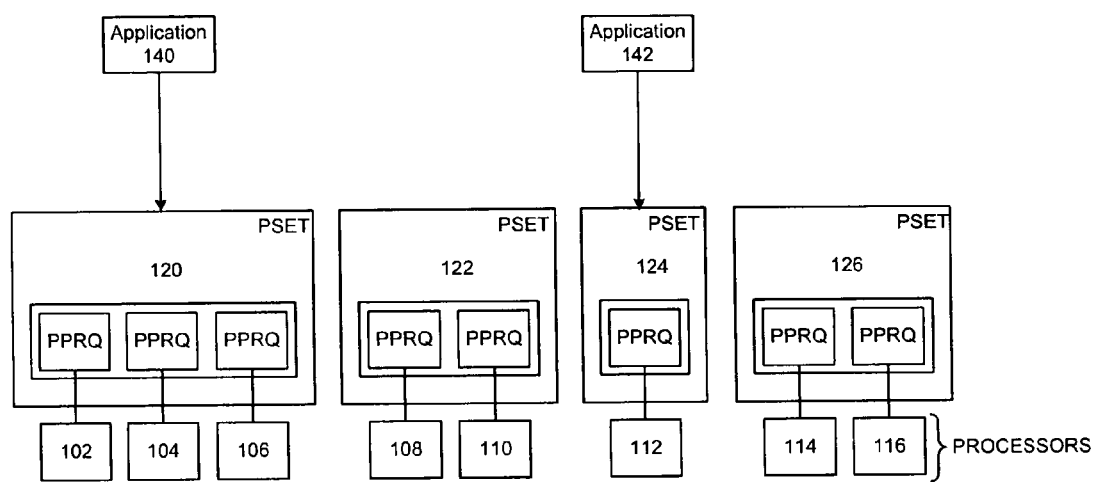
FIG. 1A shows -a computer having a plurality of processors organized into various processor sets (PSETs).
Figure 1B:
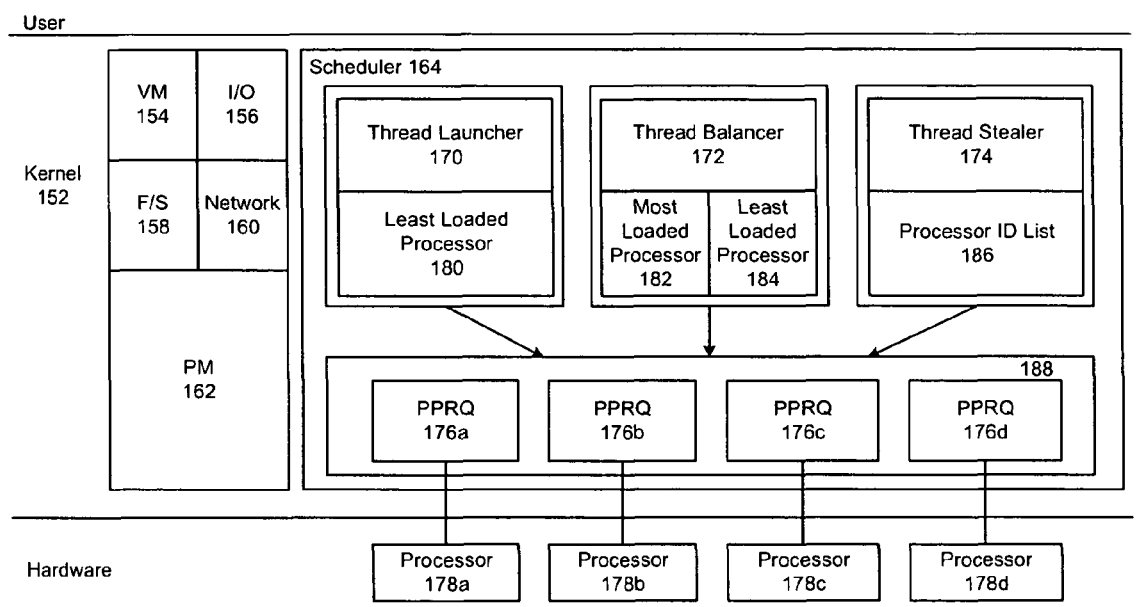
FIG. 1B shows the example scheduling resources that may be provided for a computer system.
Figure 1C:
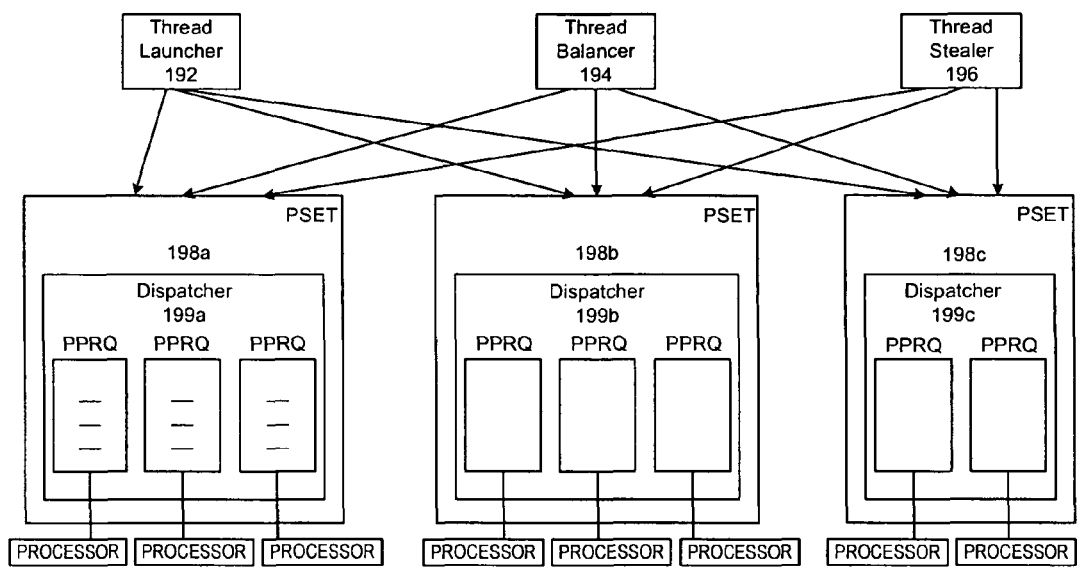
FIG. 1C shows a prior art approach for providing scheduling resources to multiple PSETs in a computer system.
Figure 2:
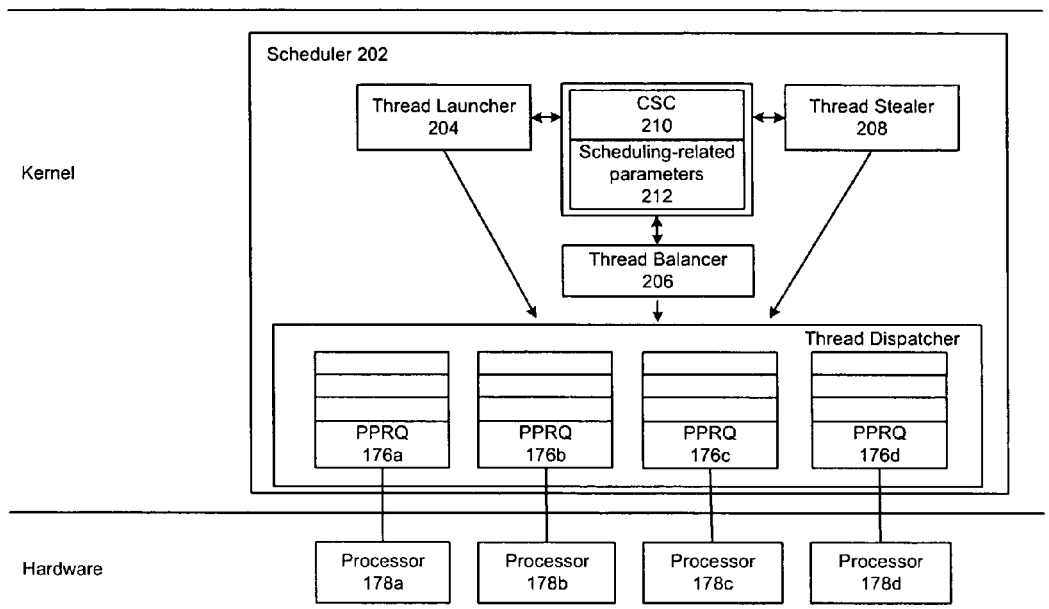
FIG. 2 shows, in accordance with an embodiment of the present invention, how a cooperative scheduling component may be employed to efficiently provide scheduling resources to processors in different PSETs of a computer system.

The features and advantages of embodiments of the invention may be better understood with reference to the figures and discussions that follow. FIG. 2 shows, in accordance with an embodiment of the present invention, a scheduler 202 having a thread launcher 204, a thread balancer 206, and a thread stealer 208. A cooperative scheduling component (CSC) 210 is configured to obtain system information, e.g., from the kernel, and to calculate scheduling-related parameters 212. CSC 210 is also shown coupled to communicate with thread launcher 204, thread balancer 206, and thread stealer 208 to provide any required subsets of scheduling-related parameters 212 to thread launcher 204, thread balancer 206, and thread stealer 208 to allow these components to perform their tasks.

By employing a single entity to obtain system data at various times and calculate the scheduling-related parameters using a single set of algorithms, embodiments of the invention ensure that thread launcher 204, thread balancer 206, and thread stealer 208 can obtain the same value when it requests the same scheduling parameter. For example, if both thread stealer 208 and thread balancer 206 both requests the identity of the most loaded processor, CSC 210 would be furnishing the same answer to both. This is in contrast to the prior art situation whereby thread stealer 208 may ascertain, using its own algorithm on data it obtained at some time (Tx), the most loaded processor and whereby thread balancer 206 may use a different algorithm on data it may have obtained at a different time (Ty) to ascertain the most loaded processor.

Figure 3:
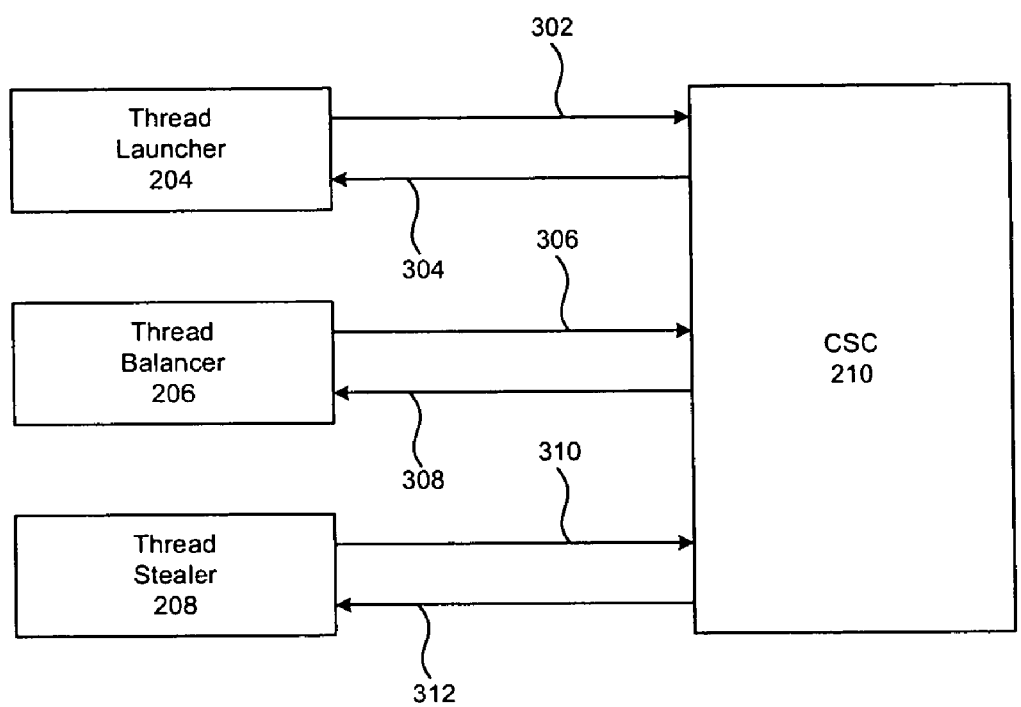
FIG. 3 shows, in accordance with an embodiment of the present invention, some of the input and output of a cooperative scheduling component to a thread launcher, a thread balancer, and a thread stealer.

FIG. 3 shows, in accordance with an embodiment of the present invention, some of the input and output of CSC 210 to thread launcher 204, thread balancer 206, and thread stealer 208. As mentioned, CSC 210 is configured to obtain system data (such as processor usage pattern, thread run-time behavior, NUMA system topology, and the like) to calculate scheduling-related parameters for use by thread launcher 204, thread balancer 206, and thread stealer 208.

Thread launcher 204 may request the identity of a processor to launch a thread, which request is furnished to CSC 210 as an input 302. CSC 210 may then calculate, based on the data it obtains from the kernel pertaining to the thread's run-time behavior and the usage data pertaining to the processors for example, the identity of the processor to be furnished (output 304) to thread launcher 204.

Likewise, load balancer 206 may request (input 306) the set of most loaded processors and the set of least loaded processors, as well as the most suitable candidate threads to move from the set of the most loaded processors to the set of least loaded processors to achieve load balancing among the processors. These USRPs are then calculated by CSC 210 and furnished to thread balancer 206 (output 308). The calculation performed by CSC 210 of the most loaded processors and the least loaded processors may be based on per-processor usage data, which CSC 210 obtains from the kernel, for example. In an embodiment, the average usage level is established for the processors, along with an upper usage threshold and a lower usage threshold. Processors whose usage levels exceed the upper usage threshold may be deemed most loaded whereas processors whose usage levels fall below the lower usage threshold may be deemed least loaded. The candidate thread(s) may be obtained from the thread run-time behavior and NUMA topology data, for example. NUMA topology data may be relevant in the calculation since a thread may be executing more efficiently in a given NUMA domain and such consideration may be taken into account when determining whether a thread should be deemed a candidate to be evacuated.

Thread stealer 208 may request (input 310) the identity of the most loaded processor or processor in starvation state, along with the candidate thread to be moved away from that processor (input 3. Using the thread run-time behavior data, the per-processor load information, and/or NUMA topology data, CSC 210 ascertains the most loaded processor and candidate thread to furnish (output 312) those scheduling-related parameters to thread stealer 208.

Note that the scheduling parameters of FIG. 3, as well as the data employed for their calculations, are only examples. Different algorithms employed by CSC 210 may employ different data for their calculations. Likewise, different schedulers may employ a greater number of, fewer, or different scheduling parameters in their thread launcher, thread balancer, and thread stealer components.

Figure 4:
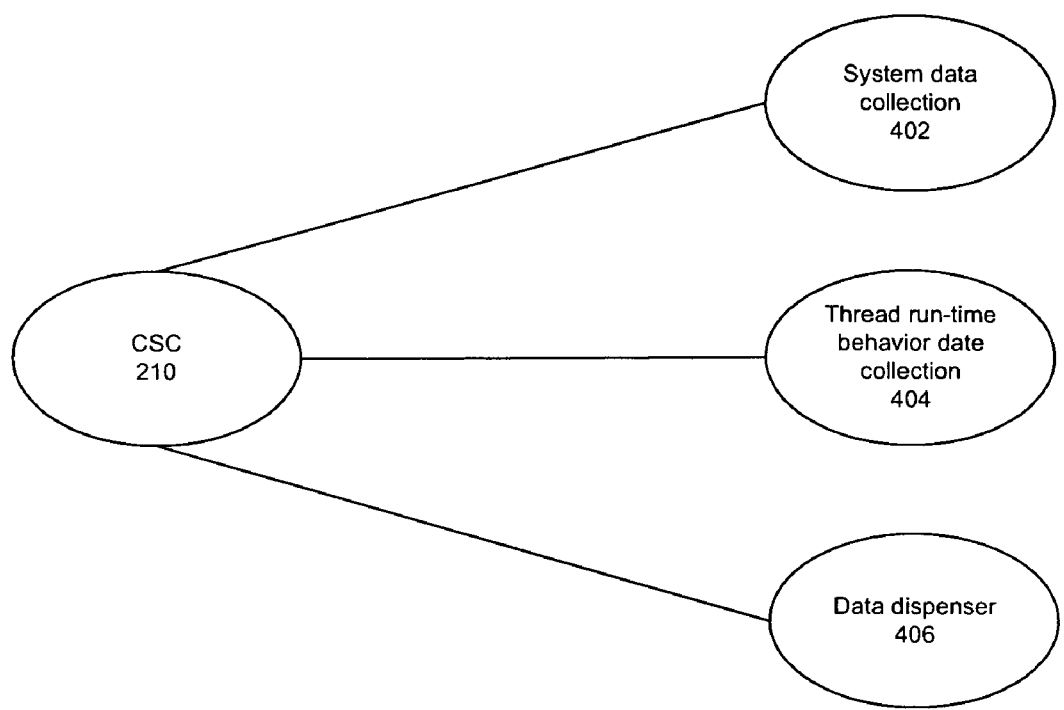
FIG. 4 shows, in accordance with an embodiment of the present invention, example tasks performed by the cooperative scheduling component.

CSC 210 may be thought of as the unified mechanism that performs three main tasks: system information collection (402 in FIG. 4), thread run-time behavior data collection (404), and dispensing USRPs to the components (406) for use in their respective tasks. As mentioned, the system information (e.g., per processor load information, NUMA topology, etc.) may be obtained, in an embodiment, from the kernel periodically. In an embodiment, the collected system information is employed to compute the USRPs upon collection. The USRPs are then stored in a centralized storage area to be dispensed to the components upon request.

Figure 5:
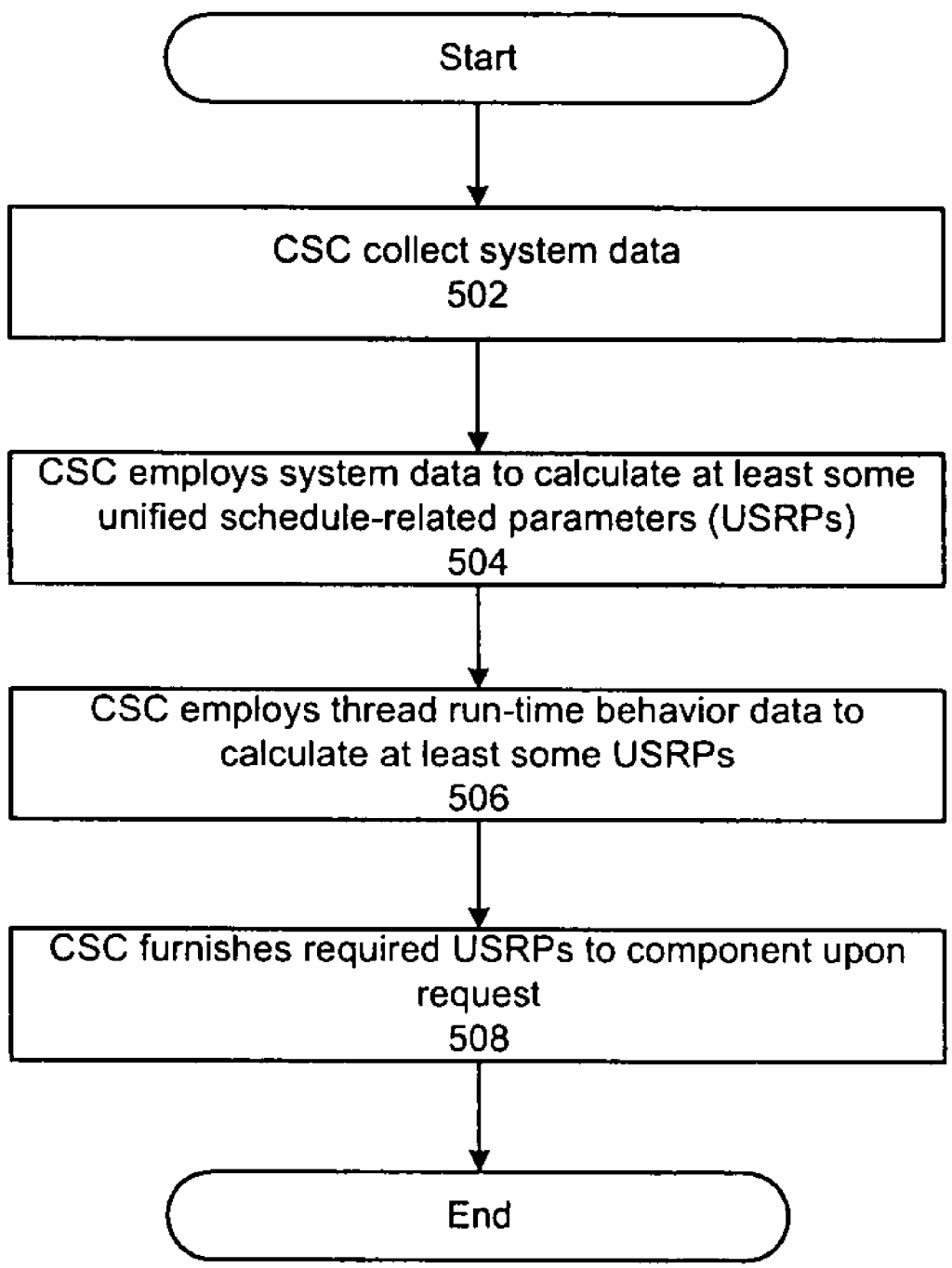
FIG. 5 shows, in accordance with an embodiment of the present invention, the steps taken by the cooperative scheduling component in calculating and providing unified scheduling related parameters to various scheduling components.

FIG. 5 shows, in accordance with an embodiment of the present invention, the steps taken to handle a request for scheduling-related parameters from one of the thread launcher, thread balancer, and thread stealer. In step 502, the system data is collected by the CSC. As mentioned, this data may take place on a periodic basis or on some pre-defined schedule. In step 504, the CSC employs the collected system data to compute at least some of the USRPs. In step 506, the CSC employs run-time behavior data to calculate other USRPs that require run-time behavior data in their calculations. In step 508, the required USRPs are furnished to the requesting component (e.g., one or more of the thread launcher, thread balancer, and thread stealer). Using the received USRPs, these components may then perform their respective tasks with minimal risks of adversely interfering with one another.

As can be appreciated from the foregoing, the invention prevents different components of the scheduling system from using conflicting data and/or data collected at different times and different schedules to calculate the same scheduling parameter (e.g., most loaded CPU). By using a single entity (e.g., the CSC) to calculate the required USRPs based on data collected by this single entity, the components are assured of receiving the same data when they request the same scheduling parameter. As such, the scheduler may be able to schedule the threads more efficiently since the probability of the components working against one another is substantially reduced.

Furthermore, when there are multiple PSETs in the computer system, the inventors herein realize that efficiency may be improved if scheduling resources (such as thread launching, thread balancing, and thread stealing) are administered on a PSET-by-PSET basis. For example, if a thread is assigned to a PSET for execution on one of the processors therein, that thread may be scheduled for execution on any processor of the PSET or moved among processors within a PSET if such action promotes efficiency and fairness with regard to the overall processor bandwidth of the PSET. To maintain processor partitioning integrity, that PSET is not scheduled to execute on a processor of a different PSET or moved to a processor associated with a different PSET. In this manner, efficiency in scheduling threads for execution is still achieved among the processors of a PSET.

Figure 6:
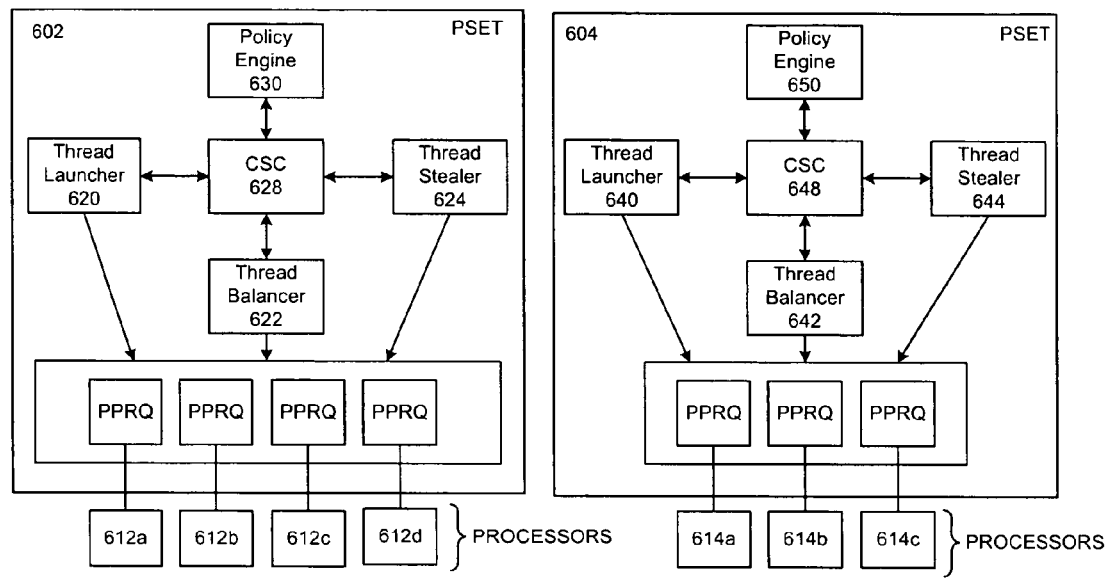
FIG. 6 shows, in accordance with an embodiment of the invention, an arrangement for administering scheduling resources on a per-PSET basis.

Furthermore, the scheduling resources should apply different policies (e.g., thread launching policies, thread balancing policies, and/or thread stealing policies) to different PSETs if the scheduling requirements are different in the different PSETs. This is because, for example, a policy that may be efficient for a particular hardware topology of a PSET may be inefficient when applied in another PSET having a different hardware topology. As another example, a policy that may be efficient for threads of a particular application running in a different PSET may be inefficient for threads of a different application executing in a different PSET. As a further example, a policy that may be efficient FIG. 6 shows, in accordance with an embodiment of the invention, an arrangement for administering scheduling resources on a per-PSET basis. In FIG. 6, there are shown two PSETs 602 and 604, representing two example PSETs of a computer system. Any number of PSETs may be created in a computer system if there is a need and there are enough processors to populate the PSETs. PSET 602 is shown having four processors 612a, 612b, 612c, and 612d. PSET 604 is shown having three processors 614a, 614b, and 614c.

As shown in FIG. 6, each of PSETs 602 and 604 has its own scheduling resources, such as its own thread launcher, its own thread balancer, and its own thread stealer. These are shown conceptually in FIG. 6 as thread stealer 620, thread balancer 622, and thread stealer 624 for PSET 602. Furthermore, thread stealer 620, thread balancer 622, and thread stealer 624 are coupled to communicate with a CSC 628 in order to receive scheduling-related parameters to enable these components to launch and/or move threads with respect to processors 612a, 612b, 612c, and 612d of PSET 602. CSC 628 is configured to obtain PSET system data pertaining to the processors of PSET 602 as well as run-time behavior data pertaining to the threads running on the processors of PSET 602 in order to calculate the aforementioned scheduling-related parameters.

CSC 628 is also shown coupled to a policy engine 630, which has access to a plurality of policies and is configured to provide PSET-specific policies for use in scheduling threads among the processors of PSET 602. In an embodiment, the system operator may set a policy attribute associated with a PSET when the PSET is created. The policy attribute indicates the policy/policies to be applied to the processors of PSET 602 when scheduling threads using one of thread stealer 620, thread balancer 622, and thread stealer 624. Note that the use of the CSC renders the provision of multiple selectable scheduling policies practical. If the scheduling components had been allowed to run their own algorithms, it would have been more complicated to provide different sets of selectable algorithms to individually accommodate the thread launcher, the thread balancer, and the thread stealer.

Likewise, PSET 604 is shown having its own thread stealer, thread balancer, and thread stealer. These are shown conceptually in FIG. 6 as thread stealer 640, thread balancer 642, and thread stealer 644 for PSET 604. Furthermore, thread stealer 640, thread balancer 642, and thread stealer 644 are coupled to communicate with a CSC 648 in order to receive scheduling-related parameters to enable these components to launch and/or move threads with respect to processors 614a, 614b, and 614c of PSET 604. CSC 648 is configured to obtain PSET system data pertaining to the processors of PSET 604 as well as run-time behavior data pertaining to the threads running on the processors of PSET 604 in order to calculate the aforementioned scheduling-related parameters.

CSC 648 is also shown coupled to a policy engine 650, which is configured to provide PSET-specific policies for use in scheduling threads among the processors of PSET 604. As mentioned, the system operator may set a policy attribute associated with a PSET when PSET 604 is created. The policy attribute indicates the policy/policies to be applied to the processors of PSET 604 when scheduling threads using one of thread stealer 640, thread balancer 642, and thread stealer 644.

Figure 7:
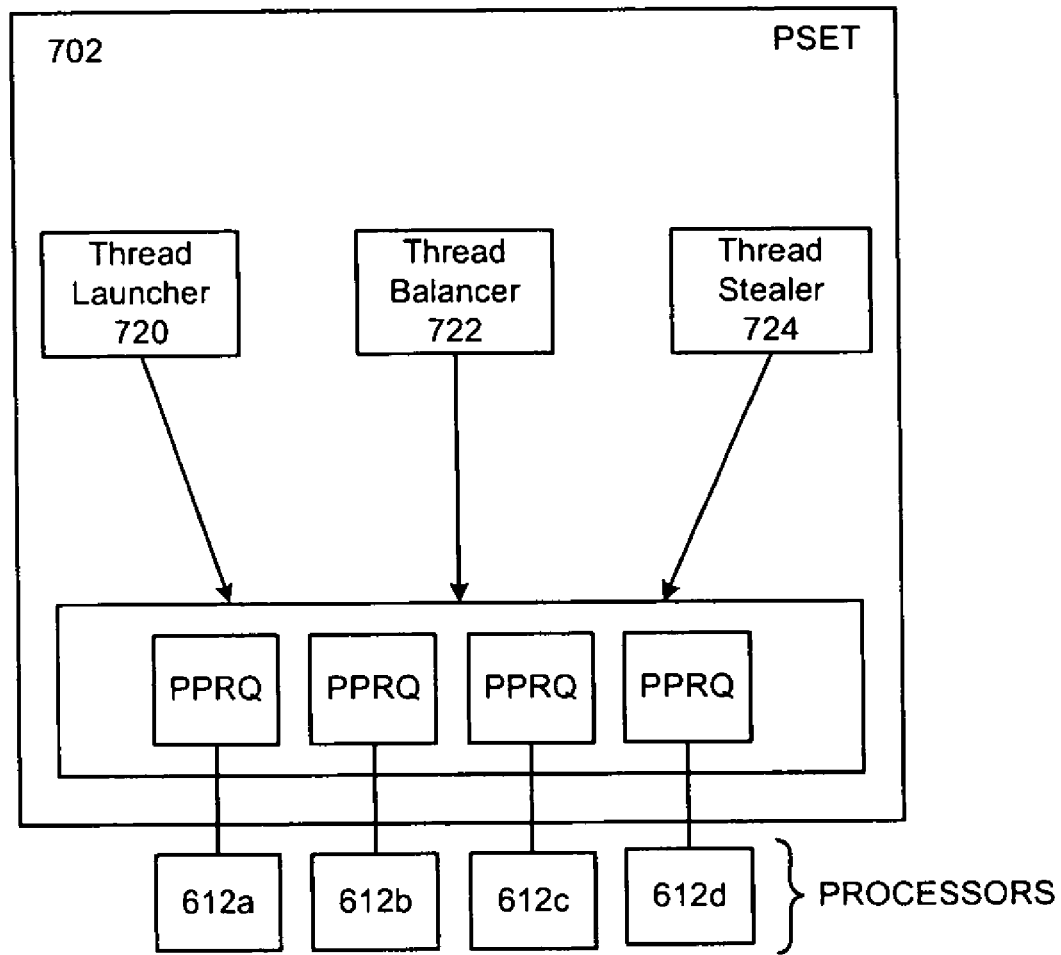
FIG. 7 shows, in an accordance of an embodiment of this invention, another arrangement for administering scheduling resources on a per-PSET basis.

In an embodiment, the CSC may be omitted in one, some, or all of the PSETs. FIG. 7 shows this implementation wherein a PSET 702 is associated with its own scheduling resources (e.g., thread launcher 720, thread balancer 722, thread stealer 724). These scheduling resources may execute a set of policies in PSET 702 while the scheduling resources associated with another PSET would execute a different set of policies. For example, thread launcher 720 of PSET 702 may execute one thread launching policy while a thread launcher associated with another PSET would execute a different thread launching policy. Multiple selectable policies may be furnished or the policy/policies to be applied in a given PSET may be furnished by the system administrator upon creating that PSET.

Figure 8:
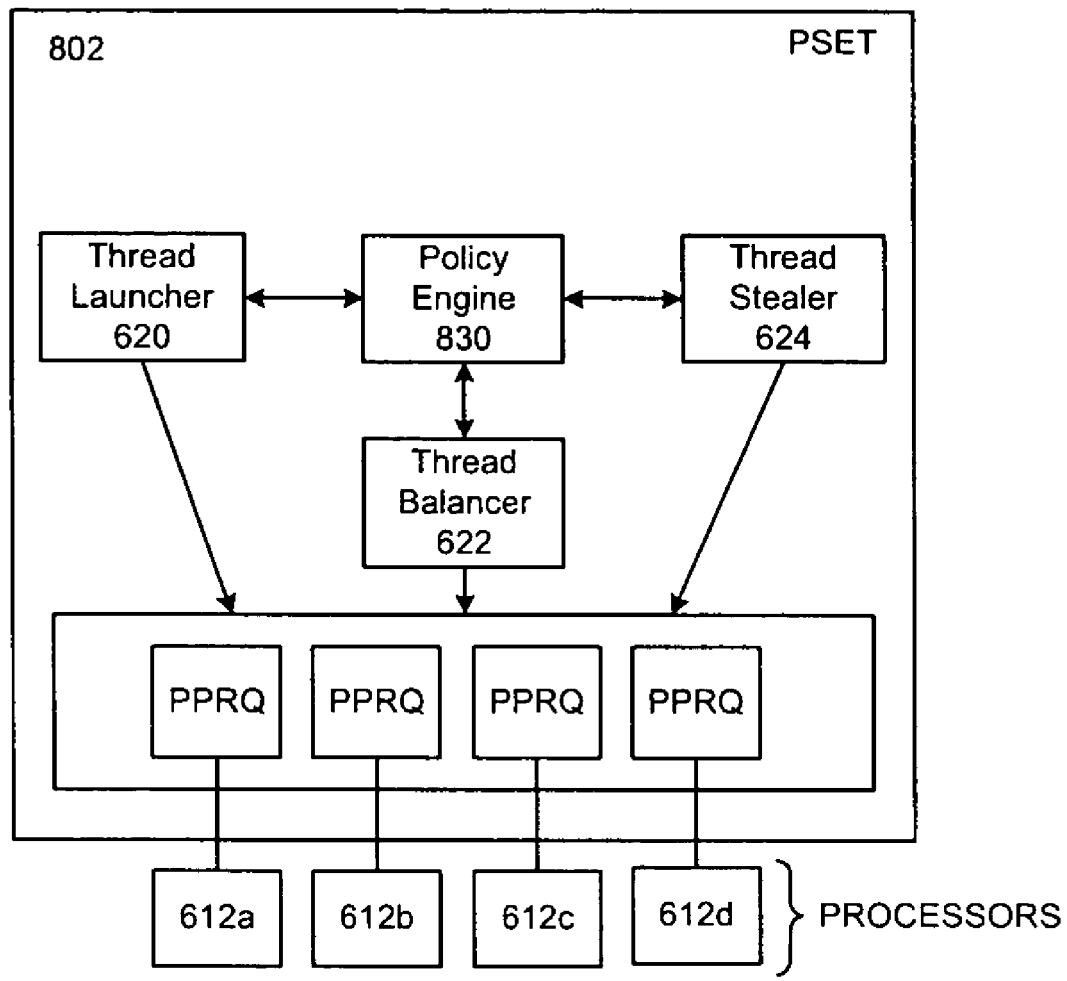
FIG. 8 shows, in an accordance of an embodiment of this invention, yet another arrangement for administering scheduling resources on a per-PSET basis.

In an embodiment, a PSET may be furnished with a policy engine without a CSC. FIG. 8 shows this implementation wherein PSET 802 is associated with its own scheduling resources (e.g., thread launcher, thread balancer, thread stealer) and its own policy engine 830. The policy engine 830 allows the system administrator to choose among different available policy/policies to be administered by the scheduling resources of the PSET. For example, the system administrator may simply select one of the policies available with policy engine 830 as the thread balancing policy to be employed with the processors of PSET 830 given the hardware topology of PSET 802 and/or the run-time behavior of the threads assigned to execute on the processors of PSET 802. In this case, another PSET in the system may employ a different thread balancing policy given its own hardware topology and/or the run-time behavior of threads assigned to execute on its processors.

As can be appreciated from the foregoing, embodiments of the invention enable different PSETs to have different policies for their scheduling components (e.g., thread launcher, thread balancer and/or thread stealer). With this capability, the system administrator may be able to improve performance by designating different PSETs to execute different scheduling policies based on the hardware topology of individual PSETs and/or the run-time behavior of threads assigned to execute in those individual PSETs. The provision of a CSC within each PSET further improves the scheduling performance on a per-PSET basis since the scheduling components may coordinate their efforts through the CSC of the PSET.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, an arrangement for coordinating scheduling of threads on a plurality of processor sets (PSETs), each of said plurality of PSETs having a plurality of processors, comprising:

a first processor set (PSET) having a first plurality of processors and a first set of scheduling resources, said first set of scheduling resources including at least two of a first thread launcher, a first thread balancer, and a first thread stealer; and a second processor set (PSET) having a second plurality of processors and a second set of scheduling resources, said second set of scheduling resources including at least two of a second thread launcher, a second thread balancer, and a second thread stealer, wherein said first set of scheduling resources is configured to schedule threads assigned to said first PSET only among processors of said first plurality of processors and said second set of scheduling resources is configured to schedule threads assigned to said second PSET only among processors of said second plurality of processors, wherein each of the first thread launcher and second thread launcher is configured to launch a thread on a corresponding processor of a corresponding one of the first and second PSETS, wherein each of the first thread balancer and second thread balancer is configured to balance threads across processors by shifting threads from one or more processors to one or more other processors according to processor loads in a corresponding one of the first and second PSETs, and wherein each of the first thread stealer and second thread stealer is configured to shift a thread from one processor to another idle processor of a corresponding one of the first and second PSETs.

2. The arrangement of claim 1 wherein said first set of scheduling resources is configured to execute a first set of scheduling policies and said second set of scheduling resources is configured to execute a second set of scheduling policies different from said first set of scheduling policies, wherein the first set of scheduling policies includes at least two of a first thread launching policy, a first thread balancing policy, and a first thread stealing policy, and wherein the second set of scheduling policies includes at least two of a second thread launching policy, a second thread balancing policy, and a second thread stealing policy.

3. The arrangement of claim 1 wherein said first PSET further includes a first policy engine configured to provide a first set of scheduling policies for use in scheduling said threads assigned to said first PSET.

4. The arrangement of claim 3 wherein said first PSET further includes a first cooperative scheduling component (CSC) coupled to communicate with said first policy engine and said at least two of said first thread launcher, said first thread balancer, and said first thread stealer, said first CSC being configured to provide unified scheduling-related parameters (USRPs) for use by said at least two of said first thread launcher, said first thread balancer, and said first thread stealer in scheduling said threads assigned to said first PSET.

5. The arrangement of claim 3 wherein said second PSET further includes a second policy engine configured to provide a second set of scheduling policies for use in scheduling said threads assigned to said second PSET.

6. The arrangement of claim 5 wherein said second PSET further includes a second cooperative scheduling component (CSC) coupled to communicate with said second policy engine and said at least two of said second thread launcher, said second thread balancer, and said second thread stealer, said second CSC being configured to provide second unified scheduling-related parameters (USRPs) for use by said at least two of said second thread launcher, said second thread balancer, and said second thread stealer in scheduling said threads assigned to said second PSET.

7. The arrangement of claim 1 wherein said first PSET further includes a first cooperative scheduling component (CSC) coupled to communicate with said at least two of said first thread launcher, said first thread balancer, and said first thread stealer, said first CSC being configured to provide first unified scheduling-related parameters (USRPs) for use by said at least two of said first thread launcher, said first thread balancer, and said first thread stealer in scheduling said threads assigned to said first PSET.

8. The arrangement of claim 7 wherein said first CSC is configured to calculate at least some of said first USRPs using thread run-time behavior data pertaining to said threads assigned to said first PSET.

9. The arrangement of claim 8 wherein said thread run-time behavior data is embedded in said threads assigned to said first PSET.

10. The arrangement of claim 1 wherein said first set of scheduling resources includes all three of said first thread launcher, said first thread balancer, and said first thread stealer.

11. The arrangement of claim 10 wherein said second set of scheduling resources includes all three of said second thread launcher, said second thread balancer, and said second thread stealer.

12. In a computer system having a first processor set (PSET) and a second PSET, said first PSET being associated with a first plurality of processors, said second PSET being associated with a second plurality of processors, an arrangement for coordinating scheduling of threads, comprising:

first scheduling resource means associated with said first PSET, said first scheduling resource means being configured to implement at least two of a first thread launcher, a first thread balancer, and a first thread stealer; and second scheduling resource means associated with said second PSET, said second scheduling resource means being configured to implement at least two of a second thread launcher, a second thread balancer, and a second thread stealer, wherein said first scheduling resource means being configured to schedule threads assigned to said first PSET only among processors of said first plurality of processors and said second scheduling resource means is configured to schedule threads assigned to said second PSET only among processors of said second plurality of processors, wherein each of the first thread launcher and second thread launcher is configured to launch a thread on a corresponding processor of a corresponding one of the first and second PSETS, wherein each of the first thread balancer and second thread balancer is configured to balance threads across processors by shifting threads from one or more processors to one or more other processors according to processor loads in a corresponding one of the first and second PSETs, and wherein each of the first thread stealer and second thread stealer is configured to shift a thread from one processor to another idle processor of a corresponding one of the first and second PSETs.

13. The arrangement of claim 12 wherein said first scheduling resource means is configured to execute a first set of scheduling policies and said second scheduling resource means is configured to execute a second set of scheduling policies different from said first set of scheduling policies, wherein the first set of scheduling policies includes at least two of a first thread launching policy, a first thread balancing policy, and a first thread stealing policy, and wherein the second set of scheduling policies includes at least two of a second thread launching policy, a second thread balancing policy, and a second thread stealing policy.

14. The arrangement of claim 12 wherein said first PSET further includes a first policy engine configured provide a first set of scheduling policies for use in scheduling said threads assigned to said first PSET.

15. The arrangement of claim 14 wherein said second PSET further includes a second policy engine configured to provide a second set of scheduling policies for use in scheduling said threads assigned to said second PSET.

16. The arrangement of claim 15 wherein said second PSET further includes a second cooperative scheduling component (CSC) coupled to communicate with said second policy engine and said at least two of said second thread launcher, said second thread balancer, and said second thread stealer, said second CSC being configured to provide second unified scheduling-related parameters (USRPs) for use by said at least two of said second thread launcher, said second thread balancer, and said second thread stealer in scheduling said threads assigned to said second PSET.

17. The arrangement of claim 12 wherein said first PSET further includes a first cooperative scheduling component (CSC) coupled to communicate with said at least two of said first thread launcher, said first thread balancer, and said first thread stealer, said first CSC being configured to provide first unified scheduling-related parameters (USRPs) for use by said at least two of said first thread launcher, said first thread balancer, and said first thread stealer in scheduling said threads assigned to said first PSET.

18. The arrangement of claim 12 wherein said first scheduling resource means includes all three of said first thread launcher, said first thread balancer, and said first thread stealer.

19. The arrangement of claim 18 wherein said second scheduling resource means includes all three of said second thread launcher, said second thread balancer, and said second thread stealer.

20. In a computer system, a method for scheduling threads for execution, comprising:

providing a first processor set (PSET) having a first plurality of processors and a first set of scheduling resources, said first set of scheduling resources including at least two of a first thread launcher, a first thread balancer, and a first thread stealer;

providing a second processor set (PSET) having a second plurality of processors and a second set of scheduling resources, said second set of scheduling resources including at least two of a second thread launcher, a second thread balancer, and a second thread stealer, wherein each of the first thread launcher and second thread launcher is configured to launch a thread on a corresponding processor of a corresponding one of the first and second PSETs, wherein each of the first thread balancer and second thread balancer is configured to balance threads across processors by shifting threads from one or more processors to one or more other processors according to processor loads in a corresponding one of the first and second PSETs, and wherein each of the first thread stealer and second thread stealer is configured to shift a thread from one processor to another idle processor of a corresponding one of the first and second PSETs;

scheduling, using said first set of scheduling resources, threads assigned to said first PSET only among processors of said first plurality of processors; and scheduling, using said second set of scheduling resources, threads assigned to said second PSET only among processors of said second plurality of processors.

21. The method of claim 20 wherein said scheduling said threads assigned to said first PSET employs a first set of scheduling policies and said scheduling said threads assigned to said second PSET employs a second set of scheduling policies different from said second set of scheduling policies, wherein the first set of scheduling policies includes at least two of a first thread launching policy, a first thread balancing policy, and a first thread stealing policy, and wherein the second set of scheduling policies includes at least two of a second thread launching policy, a second thread balancing policy, and a second thread stealing policy.

22. The method of claim 20 wherein said providing said first PSET further includes providing a first policy engine configured to provide a first set of scheduling policies for use in scheduling said threads assigned to said first PSET.

23. The method of claim 22 wherein said providing said first PSET further includes providing a first cooperative scheduling component (CSC) coupled to communicate with said first policy engine and said at least two of said first thread launcher, said first thread balancer, and said first thread stealer, said first CSC being configured to provide unified scheduling-related parameters (USRPs) for use by said at least two of said first thread launcher, said first thread balancer, and said first thread stealer in scheduling said threads assigned to said first PSET.

24. The method of claim 20 wherein said providing said first PSET further includes providing a first cooperative scheduling component (CSC) coupled to communicate with said at least two of said first thread launcher, said first thread balancer, and said first thread stealer, said first CSC being configured to provide first unified scheduling-related parameters (USRPs) for use by said at least two of said first thread launcher, said first thread balancer, and said first thread stealer in scheduling said threads assigned to said first PSET.

25. The method of claim 24 wherein said first CSC is configured to calculate at least some of said first USRPs using thread run-time behavior data pertaining to said threads assigned to said first PSET.

26. The method of claim 25 wherein said thread run-time behavior data is embedded in said threads assigned to said first PSET.

27. An article of manufacture comprising a program storage medium having computer readable code embodied therein, said computer readable code being configured to schedule threads for execution on a computer having at least a first processor set (PSET) and a second PSET, said first processor set (PSET) having a first plurality of processors and a first set of scheduling resources, said first set of scheduling resources including at least two of a first thread launcher, a first thread balancer, and a first thread stealer; said second processor set (PSET) having a second plurality of processors and a second set of scheduling resources, said second set of scheduling resources including at least two of a second thread launcher, a second thread balancer, and a second thread stealer, comprising:

computer readable code for scheduling, using said first set of scheduling resources, threads assigned to said first PSET only among processors of said first plurality of processors; and computer readable code for scheduling, using said second set of scheduling resources, threads assigned to said second PSET only among processors of said second plurality of processors, wherein each of the first thread launcher and second thread launcher is configured to launch a thread on a corresponding processor of a corresponding one of the first and second PSETS, wherein each of the first thread balancer and second thread balancer is configured to balance threads across processors by shifting threads from one or more processors to one or more other processors according to processor loads in a corresponding one of the first and second PSETs, and wherein each of the first thread stealer and second thread stealer is configured to shift a thread from one processor to another idle processor of a corresponding one of the first and second PSETs.

28. The article of manufacture of claim 27 wherein said scheduling said threads assigned to said first PSET employs a first set of scheduling policies and said scheduling said threads assigned to said second PSET employs a second set of scheduling policies different from said second set of scheduling policies, wherein the first set of scheduling policies includes at least two of a first thread launching policy, a first thread balancing policy, and a first thread stealing policy, and wherein the second set of scheduling policies includes at least two of a second thread launching policy, a second thread balancing policy, and a second thread stealing policy.

29. The article of manufacture of claim 27 wherein said first PSET further includes a first policy engine configured provide a first set of scheduling policies for use in scheduling said threads assigned to said first PSET.

30. The article of manufacture of claim 29 wherein said first PSET further includes a first cooperative scheduling component (CSC) coupled to communicate with said first policy engine and said at least two of said first thread launcher, said first thread balancer, and said first thread stealer, said first CSC being configured to provide unified scheduling-related parameters (USRPs) for use by said at least two of said first thread launcher, said first thread balancer, and said first thread stealer in scheduling said threads assigned to said first PSET.

* * * * *